United States Patent [19]

Fetterly

[11] 4,409,880

[45] Oct. 18, 1983

[54] MISSILE STOWAGE AND LAUNCHER SYSTEM

[75] Inventor: Robert F. Fetterly, Renton, Wash.

[73] Assignee: The Boeing Company, Seattle, Wash.

[21] Appl. No.: 217,242

[22] Filed: Dec. 17, 1980

[51] Int. Cl.³ .............................................. F41F 3/06
[52] U.S. Cl. ................................ 89/1.804; 89/1.815; 89/1.819; 244/137 R
[58] Field of Search ................ 89/1.815, 1.801, 1.802, 89/1.803, 1.804, 1.5 H, 1.5 G, 1.5 F, 1.5 R; 244/137 R

[56] References Cited

U.S. PATENT DOCUMENTS

| | | | |
|---|---|---|---|
| 2,717,534 | 9/1955 | Atherton, Jr. | 89/1.815 |
| 2,802,398 | 8/1957 | Beach | 89/1.817 |
| 2,807,194 | 9/1957 | Cammin-Christy | 89/1.815 |
| 2,826,120 | 3/1958 | Lang et al. | 89/1.803 |
| 2,938,434 | 5/1960 | Myron | 89/1.815 |
| 3,002,428 | 10/1961 | Johnstone | 89/1.802 |
| 3,162,088 | 12/1964 | Landstrom | 89/1.802 |
| 3,173,334 | 3/1965 | Landstrom | 89/1.802 |
| 3,249,011 | 5/1966 | Wermager et al. | 89/1.8 |
| 3,534,653 | 10/1970 | Specht et al. | 89/1.815 |
| 3,535,979 | 10/1970 | Ashley et al. | 89/12 X |
| 3,618,451 | 11/1971 | Smith | 89/1.804 |
| 3,625,108 | 12/1971 | Smith et al. | 89/1.804 |
| 4,040,334 | 8/1977 | Smethers, Jr. | 89/1.804 |

Primary Examiner—David H. Brown
Attorney, Agent, or Firm—Christensen, O'Connor, Johnson & Kindness

[57] ABSTRACT

A plurality of missiles stowed within and adapted to be launched from a carrier aircraft, are arranged in cone-shaped clusters, that are in turn nested together to achieve a high density payload. The various clusters are independently rotatable about the conical axes so that individual missiles can be selected at random and moved into a launching position. For this purpose each missile cluster is assembled and secured on an annular support, that in turn is rotatably mounted on an annular bearing structure, wherein each cluster support and associated bearing structure have registerable circumferential gaps congruently disposed with a launching port in an exterior wall of the aircraft. Individual missiles of an inner nested cluster are thus movable, by rotating the associated cluster, into registry with the gaps in adjacent clusters and hence with the launching port and are then transversely and outwardly ejected from the cluster and through the port. The conical clustering of the missiles is used to advantage for high density payload delta-wafer shaped missiles, which are arranged in each cluster so that the longitudinal axes of the missiles lie along the slant of the cone pointing toward the cone apex and the aft ends are disposed in a step-wise circular array around the base of the cone.

18 Claims, 8 Drawing Figures

MISSILE STOWAGE AND LAUNCHER SYSTEM

BACKGROUND OF THE INVENTION

The invention pertains to systems for stowing missiles in a carrier aircraft and for transporting such individual missiles from their stowed position to a launching position from which the individual missiles are launched.

A variety of missile stowing and launching systems have previously been developed for aircraft carried weaponry and other projectiles. In the design of such known systems, there has been an effort to accommodate at least two principal design goals, namely, payload density and missile selectivity. The former design objective maximizes the strike capacity for each carrier aircraft and the latter factor affords the option of selecting individual missiles according to such specifications as explosive-type, guidance/propulsion characteristics and range. These options enable missiles to be selected and matched according to the nature of particular targets.

The above design objectives and others such as rate of sequential launching, adaptability to existing missile bay configurations, and ready access for maintenance, have resulted in design tradeoffs that have significantly compromised one or more of the above sought after features or design goals.

The tradeoff between payload density (and hence strike capacity) versus missile selectivity is especially severe in connection with attempts to devise a stowage and launching apparatus for certain missile shapes, such as those configured for transonic flight which employ a basic delta or delta-wafer configuration. The delta-shaped missile does not lend itself to some of the more common stowing and launching arrangements. In this respect, the present invention, as disclosed herein, has been found particularly advantageous for delta-shaped missiles, although it will be appreciated from the detailed description set forth hereinafter, that the invention is also useful for a wide variety of missile types and configurations.

Accordingly, an object of the present invention is to provide a missile stowing and launching system, suitable for being mounted in a carrier aircraft, that uniquely accommodates a high density missile payload while at the same time affords unlimited missile selectivity from among all of the stowed missiles.

Another object of the invention is to maximize the payload density and afford the unlimited missile selectivity as stated in the above object, in a system that is compatible with delta and delta-wafer shaped missiles.

A further object of the invention is to provide such a missile stowage and launcher system that has the further desirable characteristics of accommodating relatively easy access to each of the stowed missiles for maintenance, when the carrier aircraft is grounded, and that has a configuration which is compatible with, and can be retrofitted to the missile bays in many existing carrier aircraft.

Still another object is to provide a missile stowage and launcher system having the above-mentioned objectives of accommodating a high density payload and unlimited missile selectivity, together with the further capability of a rapid sequential launching rate.

SUMMARY OF THE INVENTION

The above-stated objects and advantages, and others that will become apparent from the disclosure herein, are achieved in a missile stowage and launcher system that in accordance with the invention is characterized by a plurality of rotary missile supports, each of which mounts a cluster of missiles so arranged as to describe a cone. The longitudinal axes of the clustered missiles on each rotary support are disposed along the slant of the associated cone shape and at circumferentially spaced locations so that the interior of each described cone is essentially hollow. The plurality of cluster supports are in turn mounted for rotation in stationary bearings which are relatively positioned so that the conical shaped missile clusters are nested one within another. Associated with the rotary supports and stationary bearings are means for accessing and launching individual missiles from each of the clusters.

More particularly, the means for accessing and launching the individual missiles includes the provision of circumferential openings in at least certain of the rotary supports and associated stationary bearings such that the circumferential opening in the rotary support is rotatable into circumferential registration with a mating opening in the stationary bearing for enabling a missile on an inner nested cluster to be rotated on its support into a launching position in registry with the circumferential openings in the rotary support and in the associated bearing of an adjacent missile cluster. From this launching position, the missile is ejected in a direction transverse and outward from the associated cluster axis.

In a preferred embodiment, the plurality of missiles are each of a delta shape and each of the missile clusters is arranged so that the aft ends of the missiles of the cluster are in a span-tip to span-tip, step-wise circular array around the base of the described cone and the nose ends of the missiles point toward an imaginary apex of the cone. By clustering the missiles in this manner, a greater tracking density is achieved, especially for delta and delta-wafer shaped missiles. Moreover, the high packing density and hence the greater payloads, are attained without sacrificing the desired, unlimited selectivity of the missiles by which individual missile characteristics such as explosive-type, guidance and propulsion features and range can be individually selected for a particular target.

Furthermore, in the preferred form of the invention the rotary supports are each of annular shape and have a truncated conical portion on which the associated cluster of missiles is mounted, and a flange portion that projects radially outwardly from the base of the conical portion, for cooperating with the associated stationary bearing which partially surrounds the support's periphery. The circumferential opening in the support is provided by a circumferential gap along the slant of the truncated conical portion and a registering circumferential gap in the flange. Similarly, the bearing for each support is provided by an annular bearing structure having a circumferential gap, which is fixedly disposed in alignment with like circumferential gaps in the other bearing structures and in fixed registration with a launching port in the wall of the carrier aircraft.

When the various missile clusters are in the stowed position, each of the rotary supports are driven to position the circumferential openings defined thereby in registration with the fixed circumferential openings of the associated bearing structures. The launching port is thus free of obstructions. To launch a missile, one of the cluster supports is rotated to bring a selected missile of that cluster into circumferential registration with the openings in the other cluster supports and hence into registration with the launching port. An ejector that normally holds the missile to the rotary support is then actuated to eject the missile outwardly through the registering openings in the adjacent missile clusters and out through the launching port of the carrier aircraft. During ejectment the missile is forced from the cluster in a direction transverse to the cluster axis and also generally transverse to the longitudinal axis of the missile.

To provide a complete disclosure of the invention, reference is made to the appended drawings and following description of certain particular and preferred embodiments.

DETAILED DESCRIPTION

Figure 1:
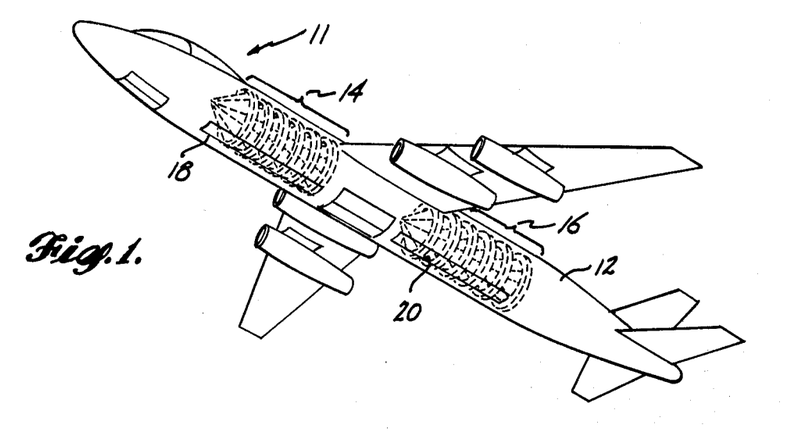
FIG. 1 is an isometric view of an aircraft carrying the missile stowage and launcher system in accordance with a preferred embodiment of the invention.

With reference to FIG. 1, the missile stowage and launcher system is disclosed herein by reference to a particular and preferred embodiment in which a carrier aircraft 11 has a fuselage 12. Forward and aft interior cylindrical bays of fuselage 12 are adapted for receiving forward and aft missile magazines 14 and 16, respectively, each of which magazines is formed by a plurality of missile clusters arranged to describe the shape of cones and nested one into another and mounted so that each cluster is independently rotatable about the axis of symmetry. As described in greater detail below, the magazines 14 and 16 of nested conical missile clusters are so arranged with respect to forward and aft launching ports 18 and 20, respectively, that individual missiles can be selected, rotated with the cluster to a launching position and ejected from its cluster and associated magazine 14 or 16 into a predetermined launching trajectory through the respective port 18 or 20.

Figure 2:
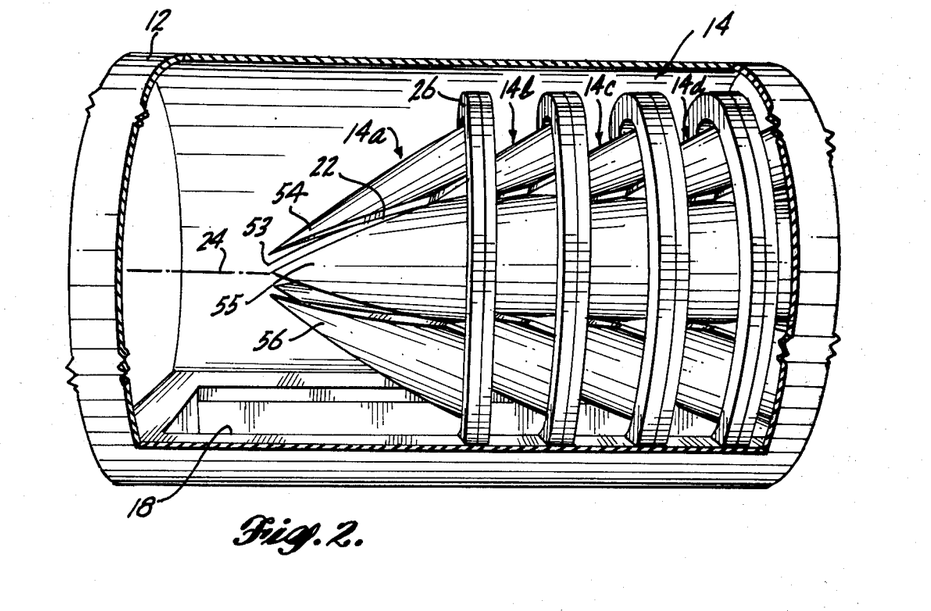
FIG. 2 is an enlarged, fragmentary, isometric view of the aircraft and missile stowage and launcher system of FIG. 1 in which a segment of the fuselage wall of the aircraft has been removed for clarity.
Figure 3:
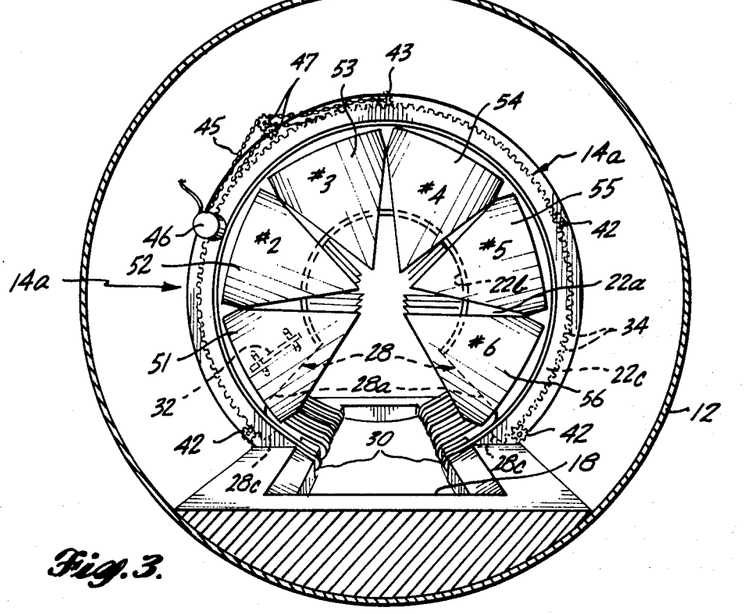
FIG. 3 is an end view in perspective of the missile stowage and launcher system as seen looking aft along the centerline of the aircraft fuselage.

Both magazines 14 and 16 are essentially the same, and thus the specific construction and other details of the preferred embodiment will be disclosed by reference to the forward magazine 14, a portion of which is shown in detail in FIGS. 2 and 3. Thus, with reference to FIG. 2, magazine 14 is comprised of a plurality of rotatable missile clusters 14a, 14b, 14c, 14d, etc., each of which describes the shape of a segmented cone. Conical clusters 14a, 14b, 14c and 14d are in turn nested so that the apex of one conical cluster resides within the hollow interior of an adjacent and forward cluster. The axes of the conical clusters are in this embodiment colinear and arranged approximately coaxial with the cylindrical midsection of fuselage 12 so that the assembly axis 24 lies substantially along the centerline of the fuselage. Launching port 18 is elongated along the length of the aircraft's fuselage 12, and is positioned on the aircraft's belly, beneath and parallel to the axis 24 of conical clusters 14a, 14b, 14c and 14d for passing the downwardly ejected missiles into a launching trajectory underlying aircraft 11.

Figure 4:
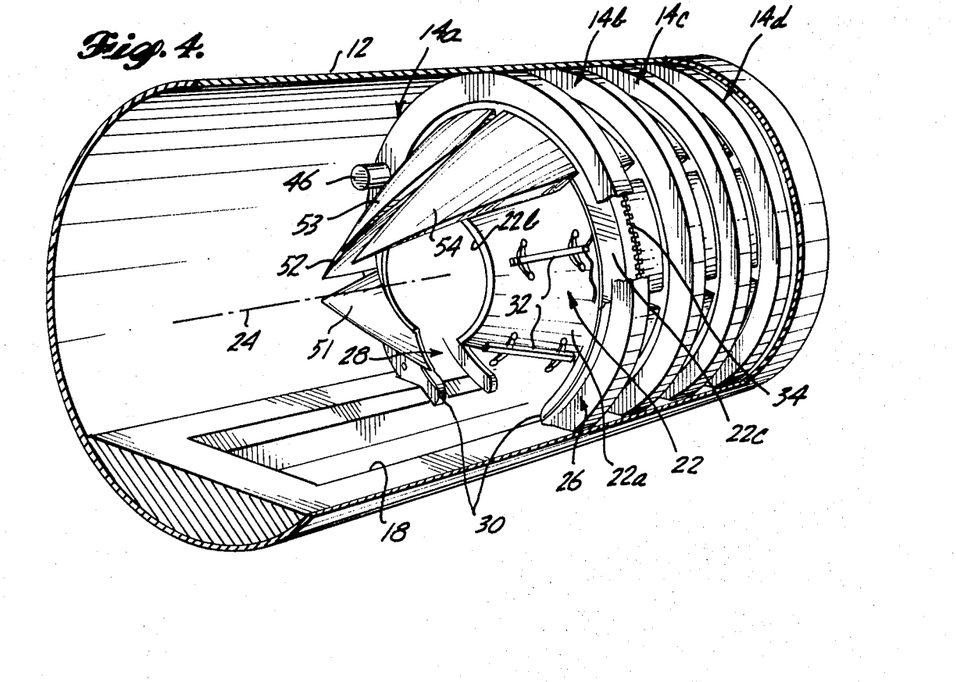
FIG. 4 is a view similar to FIG. 2, but with certain of the missiles omitted for clarity, and at a slightly different perspective.

Since the plurality of missile clusters 14a, 14b, 14c and 14d are identical, only the forwardmost cluster 14a will be described in detail. As shown in FIG. 4 cluster 14a includes a hollow, truncated and circumferentially discontinuous conical support 22 mounted for rotation about the axis 24 of the clusters in an annular bearing structure 26. Rotary support 22 and annular bearing structure 26 are each formed with a circumferential break or gap shown as a somewhat irregular gap 28 for support 22 and a matching gap 30 in the otherwise circumferentially continuous bearing structure 26 (FIGS. 3 and 4). The other clusters 14b, 14c, 14d, etc. are provided with bearing structures and supports identical to structure 26 and support 22 which are disposed at equally spaced intervals along axis 24. Structure 26 of cluster 14a and each of the corresponding bearing structures of clusters 14b, 14c and 14d are fixedly mounted with respect to the interior wall of fuselage 12 and oriented so that the gaps 30 are located in lateral registration with launching port 18 so that the ends of structure 26 that define gap 30 terminate at the sides of port 18.

Rotary support 22 includes a hollow, truncated conical body portion 22a on which are mounted a plurality of missile supporting ejectors 32, one for each of six missiles that form the cluster. The forward axial end of body portion 22a is truncated so as to form a circular opening 22b to provide clearance for the forwardly projecting missile tips of the rearwardly adjacent missile cluster 14b as illlustrated by FIG. 3. At the larger and opposite axial end of conical body portion 22a, a radially outwardly projecting flange portion 22c is provided for being received within and guided by a mating, radially inward oriented channel formed on bearing structure 26. The periphery of flange portion 22c is provided with gear drivable teeth 34 for cooperating with a powered drive gear as described herein.

Gap 28 in rotary support 22 commences at the truncated, circular opening 22b, and continues rearwardly along the sloping sides of conical portion 22a of the support, so that the edges of gap 28 are rearwardly divergent as best shown in FIG. 3. Adjacent the flange portion 22c, gap 28 widens as indicated at 28a so as to be substantially larger than gap 30 in the cooperating bearing structure 26, and then narrows circumferentially inwardly at flange 22c, so that flange 22c appears in this area as projections extending circumferentially toward each other and terminating as indicated at 28c at a separation that is at least as large as gap 30 in bearing structure 26. Gap 28 is sized and positioned so as to provide a sufficient opening therat to accommodate the rapidly outward launching of missiles from the rearwardly proximate clusters, and in this case the rearwardly adjacent cluster 14b, in the manner illustrated in FIG. 5 and described more fully below.

Annular bearing structure 26 has a channel-shaped cross section, oriented to face radially inward to provide an annular recess 26a for receiving flange portion 22c of rotary support 22. Mounted on bearing structure 26 are a plurality of circumferentially spaced ideler gears 42 rotatably mounted on pins 44 supported at opposed axial ends by the spaced side walls of the channel-shaped bearing structure 26, so that each of the idler gears 42 rotates about an axis parallel to the principal axis 24 of the conical missile clusters 14a, 14b, 14c and 14d. Gears 42 serve to center support 22 for rotation about axis 24, permitting the gap 28 in support 22 to be rotated into and out of registration with gap 30 and bearing support 26 and port 18 in fuselage 12. At another circumferential location on bearing structure 26, a drive motor, clutch and gear assembly 46 is mounted as shown in FIGS. 3 and 4 which includes a selectively clutched drive gear (not visible) for drivably engaging teeth 34 on flange portion 22c and hence for selectively rotating support 22 to a desired angular position. Assembly 46 is also coupled by a drive chain 45 and an idler sprocket 47, mounted on support 26, to another drive gear 43 that is circumferentially offset from the motor drive assembly 46 so as to maintain continuous drive coupling to support 22 when either of the driven gears encounter gap 28. By this arrangement each of the missiles held on the rotary support 22 can be rotated from a stowed position with gap 28 in registration with gap 30 of structure 26 to a launching position with any selected missile in registration with gap 30 and port 18. The rotary missile supports and cooperating bearing structures of each of the clusters 14b, 14c, 14d of magazine 14 are rotatably driven by like drive gears 43, chains 45 and idler sprockets 47 that are selectively coupled to the motor of assembly 46 by an axially extended, common drive shaft and associated individual clutch mechanisms (not visible in the drawings) located at the circumferential position shown for assembly 46 in FIG. 3. Each cluster is thus independently movable with respect to the various bearing structures, the circumferential gaps therein and port 18.

As shown in FIG. 3, each of the clusters in this embodiment is formed by a plurality of six delta-wafer shaped missiles 51, 52, 53, 54, 55 and 56. The delta-wafer missile is characterized by a delta-shaped airfoil body of maximum span adjacent the aft end, and tapering forwardly to the nose, with a relatively small thickness (hence wafer shape) along the vertical axis. Missiles 51-56 each having this characteristic shape, are arranged adjacent the outer surface of truncated conical portion 22a of support 22 so that the spans of the various missiles, adjacent their aft ends, form a step-wise circular array, concentric with the base of conical portion 22a. The centerlines of the missiles are inclined inwardly and forwardly so that the forwardly converging span of each missile occupies a segment of an imaginary cone that is superposed on portion 22a. The apex of this imaginary cone intercepts the axis 24 for rotation of the various clusters.

Each of missiles 51-56 is attached to support 22 by an associated ejector 32 having a generally elongate body 32a arranged along the slanted wall of conical portion 22a and permanently mounted in a recess provided for that purpose in the wall of support portion 22a. In this preferred embodiment, ejector 32 is a conventional device known and commercially available under an industry recognized designation of MAU-12. Its body 32a is characterized by being of generally rectangular cross section and having releasable, articulated missile engaging hooks (not shown) adapted to engage and secure corresponding hook receiving brackets that are provided in a known manner on the face of the associated one of missiles 51-56.

While the thusly provided ejector hooks and associated hook engaging brackets on the missile body provide for drawing the face (top or bottom) of the missile inwardly toward the ejector 32, forward and aft sway brackets 32b and 32c mounted crosswise of the elongate ejector body 32a provide outwardly facing supports that brace the missile in reaction to the radially inward tension on the ejector hooks so as to hold the missile securely in place until it is ejected. Sway braces 32b and 32c are coupled interiorly of body 32a to forward and aft gas cartridge operated ejector piston-cylinder assemblies (not shown). Such piston-cylinder assemblies are in communication with gas discharged by ejector cartridges (again not shown) such that when the cartridges are fired, charges of pressurized gas are channelled to the forward and aft ejector piston-cylinder assemblies which reactively drive the forward and aft sway braces 32b and 32c, which are mounted for limited transverse travel, outwardly from the ejector body 32a and hence radially outwardly and forwardly of the cluster assembly.

Figure 5:
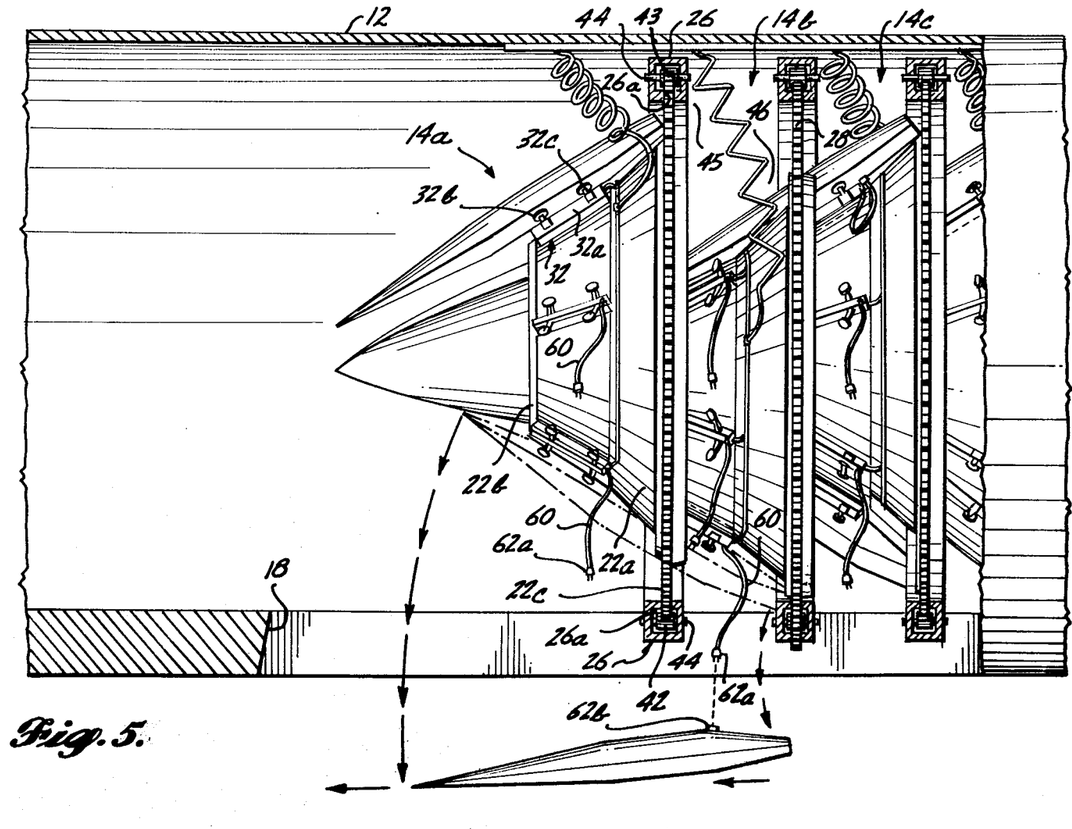
FIG. 5 is an elevational view partly in section, of that portion of the missile stowage and launcher system shown in FIG. 2 and further depicting a missile launching sequence.

As illustrated in FIG. 5, and as described more fully hereinafter, during the outward ejectment of the missile by ejector 32, gas flow modifying devices, such as adjustable flow restrictors, provide for differentially coupling the amount of discharged gas from the ejector cartridges to the forward and aft piston-cylinder assemblies associated with movable braces 32b and 32c. By so doing, the nose or forward portion of the missile may be ejected with a relatively larger force than the aft end of the missile. By differentially driving the forward and aft sway braces 32b and 32c in this manner the missile is forced outwardly and the nose rotated downwardly relative to the aft end as illustrated in FIG. 5 so as to dispose the missile in a desired trajectory, which in this instance is substantially horizontal and parallel to the longitudinal axis of the carrier aircraft 11.

Also as depicted in FIG. 5, the missiles are electrically and environmentally (cooling air) coupled to support 22 by an umbilical cable 60 that has one end permanently affixed to support 22 adjacent the associated ejector 32, and has provided on the opposite end a connector component 62a that is releasably engaged with a matching connector component 62b mounted on the body of the associated missile. The various umbilical cables 60 associated with a given missile cluster are routed around the circumference of support 22 and then are extended through a slack, stretchable cable section, such as provided in this instance by a stretchable cable coil, to a fixed cable conduit that is in communication with the carrier ship avionics and environmental (cooling) equipment. When a missile is ejected from one of the clusters, the connector components 62a and 62b release in reaction to the inertia of the missile as it is ejected through port 18.

OPERATION

By virtue of the above-described configuration, a significantly improved packing density is achieved for hypersonic missiles, especially of the delta-wafer shape. The unique configuration of such missiles, which has previously been a disadvantage in attempting to stow the missiles in a compact, relatively high density payload, is turned into an advantage by arranging the missiles into the above described conical clusters. Moreover, missile selectivity, desirable for the reasons indicated previously, is not sacrificed. Nor is the launching rate unduly limited by the unique conical clustering and inter-cone nesting of the missiles.

When the individual missiles are loaded into magazines 14 and 16 (FIG. 1), the location of each missile, together with its particular characteristics or specifications such as explosive-type magnitude, range, etc., are recorded, either manually or by automatic data processing equipment that is provided in the avionics of aircraft 11. Selection of a particular missile type is thus made from recorded knowledge of the magazine (14 or 16) and the cluster (14a, 14b, 14c, etc. or 16a, 16b, 16c, etc.) and the missile position within the cluster (#s 1–6) numbered clockwise as viewed aft from a position forward of the missile cluster as shown in FIG. 3. Thus, to select the missile at position #6 in cluster 14a of magazine 14, the motor and clutch of drive assembly 46 are energized to rotate support 22 of cluster 14a in a clockwise direction as viewed in FIG. 3 through a predetermined angle so as to dispose missile 56 (position #6) in registration with gap 30 in support 26 and hence in registration with launching port 18. The ejector 32 that holds missile 56 to support 22 is then actuated to eject the missile downwardly and outwardly through port 18.

If after ejecting missile 56, no further missiles from cluster 14a are to be ejected, support 22 of cluster 14a is rotated in a counter clockwise direction back to the stowed and standby position shown in FIG. 3, to clear gap 30 and port 18 for the ejectment of a missile from another cluster within magazine 14. For example, assuming that one of the missiles of cluster 14b as shown in FIG. 5 is to be ejected, all the supports 22 of clusters 14a, 14c, etc. have been previously rotated to the stowed, standby position clearing the launching port, while support 22 of cluster 14b is rotated by means of the motor and drive shaft of assembly 46 and the clutch associated with cluster 14b, to dispose the selected missile position in registration with port 18. As depicted in FIG. 5, a missile has been selected from a position #3 requiring that the support be rotated slightly less than 180° so that the circumferential gap 28 in the support is moved to a position approximately, diametrically opposite that of launching port 18. In this launching position the missile is ejected by firing the associated ejector 32 resulting in the simultaneous downward translation and slight counterclockwise rotation of the missile as indicated by comparing the original dotted line position and the moved position of the missile shown by the solid lines. It is observed that the launched missile is ejected through the registering circumferential gaps 28 and 30 in the forwardly adjacent support 22 and bearing structure 26, respectively, of cluster 14a. Similarly, when missiles are launched from a relatively rearward cluster, such as cluster 14c, the ejected missiles are forced outwardly through the registering gaps in the more forward clusters 14a and 14b.

The firing of the missile engine or rocket is timed so as to propel the missile forwardly when it has reached the proper launching attitude. The proper attitude in this particular embodiment is indicated in FIG. 5 by the solid line position of the launched missile, which is generally parallel to the longitudinal axis of the carrier aircraft 11, but with a slight nose down pitch.

If the selectivity of the missiles does not require jumping from cluster to cluster, the firing rate may be maximized by launching a succession of missiles from the same cluster by successively advancing the associated missile support 22 by the necessary angular increment so as to fire the missiles in the order that they are arranged on the cluster.

In the currently preferred and disclosed embodiment, the missiles are uploaded one at a time through the launching port 18 by selectively rotating to the proper position, the support 22 of the cluster that is to receive each successively loaded missile. As each missile is lifted into position and pitched to an upwardly and forwardly sloping attitude, it is attached to the associated ejector 32, using the releasable hooks described above. After each missile is thus attached to the support, the support is rotated by the necessary increment to bring an empty ejector into registration with port 18. As an alternative embodiment, the unique conical clustering and nesting of the missiles and the associated supports lend themselves to more rapid loading into the carrier aircraft by a cluster by cluster procedure, or even by a single loading step in which an entire magazine including a plurality of clusters are lifted into the fuselage 12 of the aircraft. In such case, the plurality of bearing structures 26 would be affixed to an intermediate support, such as a hollow cylindrical tube, which in turn could be inserted as a preloaded magazine unit into the fuselage 12 either through doors in the belly of the aircraft, or through a nose or aft opening in the aircraft fuselage.

Figure 6:
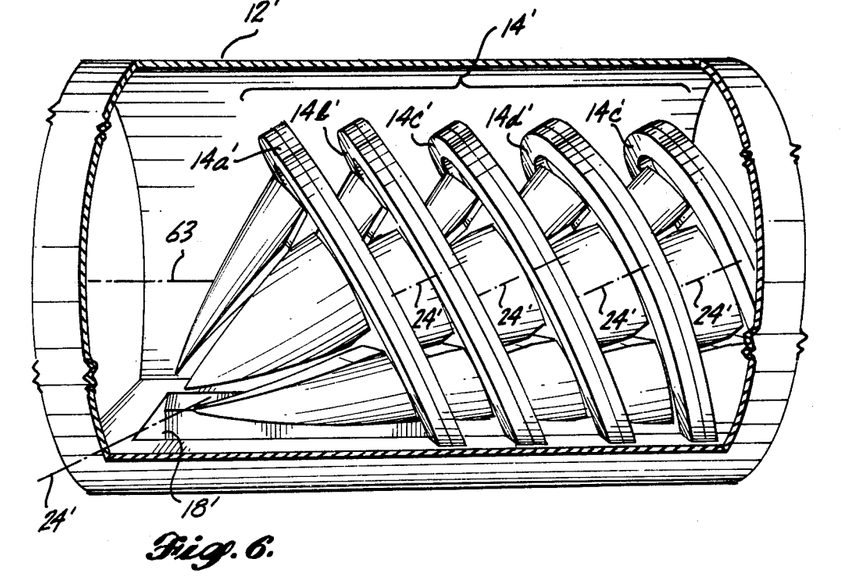
FIG. 6 is a fragmentary, isometric view, similar to FIG. 2, but showing an alternative embodiment of the missile stowage and launcher system in accordance with the principles of the invention.

As another alternative configuration of the conical clustering and nesting of the missiles, reference is made to FIG. 6 in which a missile cluster magazine 14' is disposed inside the hollow cylindrical wall of an aircraft fuselage 12' adjacent a missile launching port 18' in a manner similar to the above-described magazine 14 within fuselage 12 (FIGS. 1–5). Unlike the above-described magazine 14, the individual missile clusters 14a', 14b', 14c', 14d', etc. are oriented as illustrated in FIG. 6 so that the individual axes 24' of the cluster cones are askew of the centerline 63 of fuselage 12'. In other words, the individual axes 24' associated with the conical configuration of clusters 14a', 14b', 14c', 14d', 14e', etc. are not colinear with a common axis, but rather are askew of centerline 63, each making the same angle therewith, so that axes 24' are spaced and parallel and in a common vertical plane cutting through the centerline 63 of fuselage 12'. The skewed orientation of the cluster axes 24' in a downwardly and forwardly sloping orientation as shown in FIG. 6 is such that when an individual missile in any one of the clusters is rotated on its support (corresponding to support 22 shown in FIGS. 2 through 5) the attitude of the missile becomes substantially parallel to the longitudinal axis of port 18' and parallel to the centerline of the aircraft's fuselage, and hence horizontal, assuming that the carrier aircraft is in horizontal flight. Since each missile is in a substantially horizontal orientation when in launching position just prior to ejectment, and thus while still attached to the rotary support by its associated ejector (not shown in FIG. 6), the need to impart rotation to the missile to pitch its nose down during ejectment, as illustrated in FIG. 5 of the above-described embodiment, is eliminated or at least minimized. By appropriately dimensioning the clusters 14a', 14b', 14c', etc. and selecting a skew angle for axes 24' on the order of 45° or less, sufficient free space in the hollow interior of the truncated conical support is maintained to accommodate the nesting of the rearwardly adjacent missile cluster.

Figure 7:
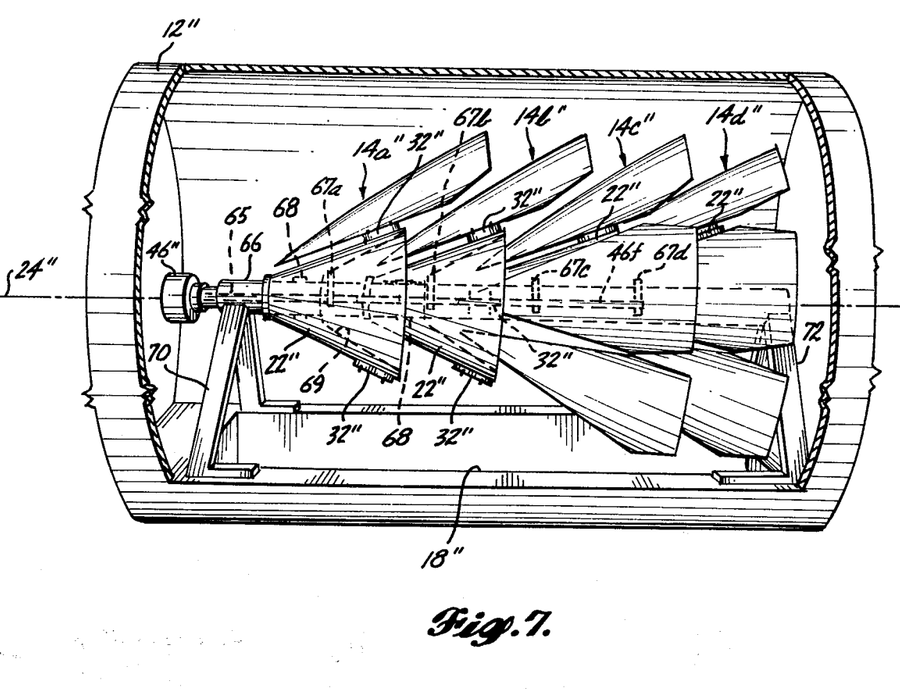
FIG. 7 is a fragmentary, isometric view, similar to FIGS. 2 and 6, but showing still another alternative embodiment.
Figure 8:
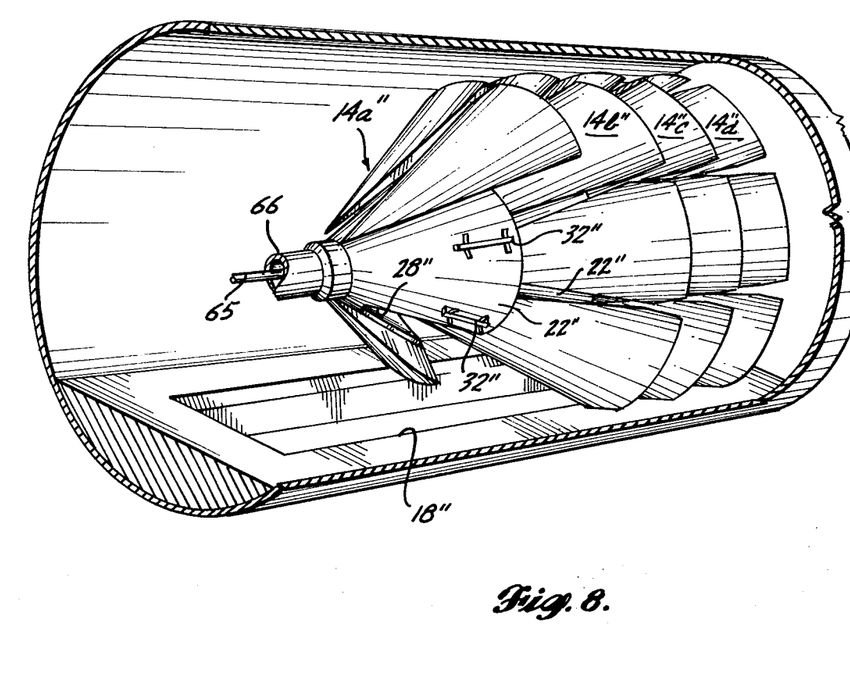
FIG. 8 is another isometric view of the alternative embodiment of FIG. 7.

With reference to FIGS. 7 and 8, still another alternative embodiment of the missile stowage and launcher system is shown in which the conical clustering and nesting of the missiles is based around a central, coaxial bearing assembly, rather than the circumferential bearing structures 26 as employed in the embodiments shown in FIGS. 1-6. In FIGS. 7 and 8, the plurality of missile clusters 14a", 14b", 14c" and 14d" are independently rotatable about a common conical axis 24" so that individual missiles can be selected at random and moved into launch position as in the case of the above-described embodiments of the invention. FIGS. 7 and 8, however, differ from the previous embodiments in that a plurality of truncated conical missile supports 22" are supported from the center of the assembly by a coaxial, tubular beam structure 66 fixedly supported within aircraft fuselage 12" by fore and aft support legs 70 and 72. The fore and aft extent of tubular bearing structure 66 is positioned within the fuselage so as to be in overlying registration with the elongate launching port 18".

The separate cluster supports 22" are again of a generally truncated conical configuration, but differ from the supports in the above-described embodiments by having a sleeve-like nose portion that mounts an annular bearing assembly 68 that in turn mounts each conical support 22" for independent rotation about the outer diameter of tubular beam structure 66. The plurality of missiles of each of the clusters 14a", 14b", 14c" and 14d" are arranged and secured to their respective supports 22" by ejectors 32" which are in turn fixedly mounted on the outer, slanted circumferential wall of the respective supports 22".

To individually and selectively rotate the plurality of supports 22", a drive assembly is provided by a common drive motor 46" fixedly mounted to a forward end of tubular structure 66 and having an associated drive shaft 65 projecting aft along the centerline of the assembly and hence coaxially within the tubular beam structure 66. Drive shaft 65 is selectively coupled to and for driving supports 22" by a plurality of clutch and drive gear assemblies 67a, 67b, 67c and 67d respectively corresponding to the clusters 14a", 14b", 14c" and 14d". Although not shown in detail in FIG. 7, clutch and gear drive assemblies 67a–67d include a drive gear that protrudes through the wall of tubular beam structure 66 and engages a mating, circular gear track (again not specifically shown) mounted aft of the associated annular bearing assembly 68 on an interior wall surface 69 of the truncated conical support 22". The diameter of tubular beam structure 66 and the shape and size of the interior wall surface 69 of each conical support 22" is such as to accommodate the forwardly and inwardly projecting noses of the missiles in the rearwardly adjacent cluster such as shown by the nose ends of missile cluster 14b" projecting forwardly into the free space between interior wall surface 69 of the forwardmost support 22" and the outer diameter of tubular support structure 66.

To accommodate the launching of one of the interior nested missiles in clusters 14b", 14c" and 14d", the missile cluster supports 22" are formed with a circumferential discontinuity or gap 28" as shown in FIG. 8 for the forwardmost support 22". Gap 28" is similar to the gaps 28 shown and described above in connection with FIGS. 3 and 4 of the embodiment disclosed by FIGS. 1-6, but differs somewhat in that gap 28" need only be provided adjacent the aft and larger diameter end of support 22". In other words, gap 28" need not extend through the sleeve-like nose portion of support 22" in which bearing assembly 68 is mounted. Moreover, since the supports 22" are held and rotated with respect to a centrally disposed bearing structure, here in the form of tubular beam structure 66, there is of course no need to shape the bearing structure for accommodating the launching of the missiles as required of the outer circumferential bearing structures 26 shown and described above in connection with the embodiment of FIGS. 1-5.

While only particular embodiments have been disclosed herein, it will be readily apparent to persons skilled in the art that numerous changes and modifications can be made thereto including the use of equivalent devices and means without departing from the spirit of the invention.

The embodiments of the invention in which an exclusive property or privilege is claimed are defined as follows:

1. A missile stowage and launcher system for a plurality of missiles each having a longitudinal axis, comprising:

first and second rotary missile support means for supportively mounting first and second clusters of missiles, respectively, each of said clusters of missiles describing the shape of a cone that has a central axis and in which the longitudinal axes of the associated missiles of each of such conically shaped clusters of missiles are disposed along the slant of the described cone at circumferentially spaced locations thereabout;

first and second bearing means for respectively mounting said first and second rotary missile support means for rotation about the central axes of said first and second conically shaped clusters of missiles, said first and second bearing means being relatively disposed so that said second conically shaped cluster of missiles is nested within said first conically shaped cluster of missiles;

means associated with said first and second rotary missile support means for launching individual missiles from said first and second conically shaped clusters transversely and outwardly with respect to the central axes of said first and second conically shaped clusters; and said first rotary missile support means being configured to provide an opening for the transverse and outward launching therethrough of a missile from said second conically shaped cluster.

2. The system of claim 1 adapted for being mounted in a carrier having a wall structure that at least partially surrounds said first and second rotary missile support means and first and second bearing means, said wall structure having a launching port through which missiles of said conically shaped clusters are launched, and wherein said first rotary missile support means comprises an annular missile support structure having a gap in the circumference thereof that provides said opening so that said annular missile support structure is rotatable to position said opening in transverse registration with said launching port such that individual missiles of said second conically shaped cluster are movable by rotation of said second rotary missile support means to a launching position at which an individual missile thereof is in transverse registration with said opening provided in said first rotary missile support means and said launching port in said wall structure of said carrier for being launched transversely and outwardly therethrough.

3. The system of claim 1 wherein said first and second rotary missile support means are oriented so that the central axes of the first and second conically shaped clusters mounted thereon are colinear.

4. The system of claim 1 wherein said means for launching individual missiles comprises an ejector means for each missile, said ejector means including means for securing individual missiles to their respective first and second rotary missile support means.

5. The system of claim 1, wherein said first and second bearing means comprise a common beam supported so as to extend coaxially through said first and second conically shaped clusters and said first and second rotary missile support means, and means for rotatably mounting said rotary missile support means on said beam at axially spaced intervals.

6. The system set forth in claim 1 wherein said first and second rotary missile support means are oriented, so that the central axes of the first and second conically shaped clusters mounted thereon are spaced apart and parallel.

7. The system of claim 6, wherein said first and second rotary missile support means are oriented so that the central axes of the first and second conically shaped clusters are disposed in a common plane.

8. The system set forth in claim 1 wherein said missiles each have a delta-shaped airfoil structure and each of said first and second conically shaped missile clusters are arranged with the aft ends of said airfoil structures in a span-tip to span-tip stepwise circular array, and with the nose ends pointing toward an apex of the cone shape described by each of the first and second conically shaped clusters.

9. The system of claim 8 wherein said circular array is discontinuous at the circumferential opening in said annualar missile support structure of said first rotary missile support means.

10. The system of claim 1 wherein said first rotary missile support means comprises an annular missile support structure, and wherein said first bearing means comprises a bearing structure which circumferentially cooperates with said annular missile support structure for relative rotation therebetween about the central axis of said first conically shaped cluster, said annular missile support structure and said bearing structure having registerable circumferential openings through which a missile of said second conically shaped cluster is transversely and outwardly launched, and wherein said means for launching individual missiles includes missile ejector means coacting between said second rotary missile support means and said second conically shaped cluster of missiles, and drive means for rotating said second rotary missile support means relative to said second bearing means for successively disposing individual missiles of said second conically shaped cluster in registry with said circumferential openings in said annular missile support structure and said bearing structure of said first rotary missile support means and said first bearing means, respectively.

11. The system set forth in claim 10 further comprising:

a third rotary missile support means for supporting a third conically shaped cluster of missiles in which the longitudinal axes of the associated missiles are disposed along the slant of a cone shape described by said third conically shaped cluster, said third conically shaped cluster of missiles having a central axis;

a third bearing means for rotatably mounting said third rotary missile support means for rotation thereof about the central axis of said third conically shaped cluster and being located so that said third conically shaped cluster is nested within said second conically shaped cluster;

wherein said second rotary missile support means comprises an annular missile support structure having an opening in the circumference thereof and said second bearing means comprises a bearing structure circumferentially cooperating with said annular missile support structure of said second rotary missile support means and having an opening in its circumference that is registerable with the circumferential opening in the annular missile support structure of said second rotary missile support means; and, additional drive means for rotating said third rotary missile support means to successively dispose individual missiles of said third conically shaped cluster in transverse registry with said circumferential openings in said annular missile support structure of said second rotary missile support means and said bearing structure of said second bearing means for launching such individual missiles in succession from said third conically shaped cluster transversely and outwardly.

12. The system of claim 10 carried within an aircraft body having a launching port in an exterior wall of such body which encloses an interior missile stowage compartment, and wherein said first and second rotary missile support means and the respective first and second bearing means are arranged in said compartment such that said circumferential opening in said bearing structure of said first bearing means is in fixed registration with said launching port, whereby said circumferential opening in said annular missile support structure of said first rotary missile support means is rotatable into registration with said circumferential opening in said bearing structure and said launching port to accommodate launching of individual missiles from said second conically shaped cluster.

13. The system set forth in claim 10 wherein said annular missile support structure of said first rotary missile support means comprises a truncated conical portion adapted for receiving and mounting said first conically shaped cluster of missiles, and having a circumferential flange portion at the base of said truncated conical portion, and wherein said truncated conical and flange portions have circumferentially registrating gaps that provide said opening in the circumference of said annular missile support structure.

14. The system of claim 13 further comprising an ejector for at least one of said missiles of said first conically shaped cluster, said ejector having an elongate body and being affixed to said truncated conical portion of said annular missile support structure so as to extend along the sloping exterior surface thereof in a common plane with the central axis of the first rotary missile support means.

15. The system of claim 10 wherein said bearing structure of said first bearing means is ring-shaped and has a circumferential gap forming said opening in its circumference.

16. The system of claim 15 wherein said annular missile support structure of said first rotary missile support means comprises a circumferential flange portion that is circumferentially and rotatably engaged by said ring-shaped bearing structure.

17. In a missile stowage and launching system for stowing a plurality of delta span-shaped missiles and for individually and successively launching such missiles from their stowed positions, wherein the improvement comprises:

missile support means for arranging said plurality of missiles in a plurality of conical-shaped, nested clusters of missiles, and wherein said clusters and the associated support means comprises circumferential openings to accommodate transverse and outward launching of individual missiles from an inner nested cluster.

18. The improvement set forth in claim 17, wherein said support means for said plurality of clusters of missiles includes means for relatively rotating at least certain of said clusters so as to selectively position individual missiles of an inner nested cluster in circumferential registry with said circumferential gap in a surrounding adjacent cluster to accommodate said launching.

* * * * *